US012695013B2

(12) United States Patent
Byun et al.

(10) Patent No.: US 12,695,013 B2
(45) Date of Patent: Jul. 28, 2026

(54) SOFT MAGNETIC POWDER CONTAINING OXIDE INSULATION FILM, MANUFACTURING METHOD THEREOF, AND POWDER CORE PRODUCED THEREFROM

(71) Applicant: KOREA INSTITUTE OF SCIENCE AND TECHNOLOGY, Seoul (KR)

(72) Inventors: Ji Young Byun, Seoul (KR); Kwang-Deok Choi, Seoul (KR); Soyeon Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 639 days.

(21) Appl. No.: 18/195,343

(22) Filed: May 9, 2023

(65) Prior Publication Data

US 2024/0127999 A1 Apr. 18, 2024

(30) Foreign Application Priority Data

Oct. 14, 2022 (KR) ........................ 10-2022-0132678

(51) Int. Cl.

| | |
|---|---|
| ***H01F 1/24*** | (2006.01) |
| ***B22F 1/16*** | (2022.01) |
| ***H01F 1/33*** | (2006.01) |
| ***H01F 3/08*** | (2006.01) |
| ***H01F 41/02*** | (2006.01) |

(52) U.S. Cl.

CPC .................. *H01F 1/24* (2013.01); *B22F 1/16* (2022.01); *H01F 1/33* (2013.01); *H01F 3/08* (2013.01); *H01F 41/0246* (2013.01); *B22F 2302/25* (2013.01)

(58) Field of Classification Search

CPC ..... H10F 1/24; H10F 1/33; H10F 3/08; H10F 41/0246; B22F 1/16; B22F 2302/25

See application file for complete search history.

(56) References Cited

U.S. PATENT DOCUMENTS

2014/0104023 A1 * 4/2014 Yang ......................... B22F 1/16 428/407

FOREIGN PATENT DOCUMENTS

| | | | |
|---|---|---|---|
| JP | 2013-546162 | | 12/2013 |
| KR | 10-2014-0148110 | | 12/2014 |
| KR | 10-1537888 | | 7/2015 |
| KR | 10-1620032 | | 5/2016 |
| KR | 101620032 B | * | 5/2016 |
| KR | 10-2017-0009928 | | 1/2017 |
| KR | 10-2019-0106792 | | 9/2019 |
| KR | 102398174 B | * | 5/2022 |

OTHER PUBLICATIONS

Jang et al, "Properties of Fe—Al Cores Made From Fe—Al Powders Annealed in a Damp Hydrogen Atmopsjere", IEEE Transactions on Magnetics, vol. 49, No. 1, Jan. 2013, pp. 11-14.*

Choi et al, Enveloping Fe—12%Al atomized powders in selectively-oxidized insulating films for soft magnetic comosite (SMS) cores:, Journal of Alloys and Compounds, 854, (2021), 157241, 1-9, pub. online Sep. 17, 2020.*

Choi et al, "Effect of annealing on magnetic propeties of iron-based soft magnetic composites with iron oxide insulator", Journal of Magnetism and Magnetic materials, 562 (2022), 169755, pp. 1-8, Jul. 28, 2022.*

Choi et al, "Magnetic propeties of Fe soft magnetic composites with a double-insulating layer comprsing Fe3O4 and silicone resin", Journal or Alloys and Compounds, 936 (2022), 168255, pp. 1-8, Nov. 29, 2022.*

Tranlation for KR 101620032-B, May 11, 2016.*

Jang, Pyungwoo, et al. "Properties of Fe—Al Cores Made From Fe—Al Powders Annealed in a Damp Hydrogen Atmosphere." IEEE transactions on magnetics 49.1 (Jan. 2013): 11-14.

Kwangdeok Choi, et al. "Development of heat-resistant insulation coatings for pure iron SMCs (Soft Magnetic Composites)" Proceedings from 2021 Fall Conference of Korean Powder Metallurgy Institute (Oct. 28, 2021) Abstract only.

Choi, K. D., et al. "Enveloping Fe—12% Al atomized powders in selectively-oxidized insulating films for soft magnetic composite (SMC) cores." Journal of Alloys and Compounds 854 (Feb. 15, 2021): 157241.

Barin, Ihsan,et al. Thermochemical data of pure substances. 3rd Ed., 1995. Weinheim: VCH, p. 48, p. 561, and p. 650.

Choi, K. D., et al. "Magnetic properties of Fe soft magnetic composites with a double-insulating layer comprising Fe3O4 and silicone resin." Journal of Alloys and Compounds 936 (Mar. 5, 2023): 168255.

Prescott, R., et al. "The oxidation of iron-aluminum alloys." Oxidation of metals 38 (Aug. 1, 1992): 73-87.

Choi, K. D., et al. "Effect of annealing on magnetic properties of iron-based soft magnetic composites with iron oxide insulator." Journal of Magnetism and Magnetic Materials 562 (Nov. 15, 2022): 169755.

* cited by examiner

*Primary Examiner* — C Melissa Koslow

(74) *Attorney, Agent, or Firm* — LEX IP MEISTER, PLLC

(57) ABSTRACT

The present exemplary embodiments may provide soft magnetic powder including metal powder and an oxide insulation film coating a surface of metal powder particles, in which the metal powder particles may include one or more selected from pure iron or an iron-based alloy and the oxide insulation film may include an oxide of a component constituting the metal powder particles.

13 Claims, 8 Drawing Sheets

SOFT MAGNETIC POWDER CONTAINING OXIDE INSULATION FILM, MANUFACTURING METHOD THEREOF, AND POWDER CORE PRODUCED THEREFROM

CROSS-REFERENCE TO RELATED APPLICATION

This application claims priority to and the benefit of Korean Patent Application No. 10-2022-0132678 filed in the Korean Intellectual Property Office on Oct. 14, 2022, and Korean Patent Application No. filed in the Korean Intellectual Property Office on, the entire contents of which are incorporated herein by reference.

BACKGROUND OF THE INVENTION

(a) Field of the Invention

The present embodiments relate to soft magnetic powder containing an oxide insulation film, a manufacturing method thereof, and a powder core produced therefrom, and more particularly, to soft magnetic powder containing an oxide insulation film having a uniform thickness, a manufacturing method thereof, and a high-performance powder core produced therefrom.

(b) Description of the Related Art

A powder core is a composite of a soft magnetic metal powder and an insulator. Here, the insulator having excellent insulating properties may be present between the soft magnetic metal powder and the powder, thereby reducing eddy-current loss.

Since the powder cores are applied in various fields, a type and size of soft magnetic powder used vary according to characteristics of the applications. Since high magnetic flux density and permeability are important when used as a core of an electric motor, an Fe—Si alloy containing pure iron (Fe) or 3.5% or less of Si is used. In addition, since hysteresis loss is more important than eddy current loss because the powder core is used at a relatively low frequency, a powder having a size of about 100 μm is usually used. On the other hand, since the reduction of eddy current loss is important in the powder core applied to parts operating at high frequency, soft magnetic metal powders with a high specific resistance, such as Fe—Si—Al (Sendust), an Fe—Si alloy with Si content of 3% or more, an Fe-based amorphous alloy, Ni—Fe (Permalloy), and an Fe-based nano grain alloy, are used. Although the size of the powder used varies depending on the frequency, a powder having a size of several tens of μm or less is usually used.

In general, the powder core is produced by mixing and molding a soft magnetic metal powder and an insulator powder or by molding soft magnetic powder coated with an insulator.

The core loss, which is the most important factor affecting the performance of the powder core produced using the soft magnetic metal powder, is divided into the eddy current loss and the hysteresis loss, which may be represented by Equation (1) below.

$$p_{tot} = P_h + P_e = W_h f + K_e f^2 \left(f\text{: frequency, } Ke\text{: constant}\right) \quad (1)$$

Here, Ph denotes history loss and Pe denotes eddy current loss. Since depending on the frequency, the history loss is proportional to the powder of 1 and the eddy current loss is proportional to the powder of 2, at high frequency, the reduction of the eddy current loss becomes a more important factor.

The eddy current loss may be represented by Equation 2 below.

$$P_c = \frac{\pi^2 d^2 B^2 f^2}{c\rho}[\text{W/m}^3] \quad 2$$

Here, c denotes a constant, p denotes a specific resistance, d denotes a thickness (or size), and B denotes a magnetic flux density. When the operating frequency and current are fixed, it can be seen that the specific resistance of the material may be increased and the thickness may be reduced to reduce the eddy current loss. In other words, it is important to reduce the size of the powder and form a uniform insulation film on the surface of the powder so that electricity does not flow in each powder.

On the other hand, when pressurized for molding of the powder core, residual stress is generated in the powder due to deformation. This increases a coercive force and thus increases the hysteresis loss. In order to remove the residual stress, heat treatment is required after molding the powder core. It is advantageous to increase the heat treatment temperature, but when the heat treatment temperature is too high, the insulation film is destroyed, resulting in the increase in the eddy current loss.

Examples of a representative method of forming an insulation film include phosphate coating. The metal powder is reacted with phosphoric acid to form phosphate on the surface and used as an insulation film. Although an insulation film may be easily formed, there is a disadvantage in that the heat treatment temperature limit after forming the core is as low as ~350° C. On the other hand, it has been found that a method of coating a silicone resin on a phosphate coating layer may increase its heat resistance to ~600° C. Accordingly, the method has been widely adopted. In addition to this, researches on ceramic coating with excellent insulation and heat resistance have been actively conducted. Known methods include sol-gel coating of an oxide insulation film such as $SiO_2$ and $Al_2O_3$ with high insulating and heat resistance, $SiO_2$ CVD coating using a fluidized bed, a method of forming an oxide insulation film by high-temperature oxidation of a soft magnetic metal powder, and the like. However, the method has a problem in that each process has one or more of disadvantages in the process, such as complexity of the device and process, difficulty in controlling the thickness of the insulation film, and the weak bonding strength between the insulation film and the metal powder.

Korean Patent No. 10-1537888 reports a method of forming an oxide insulation film with a thickness of tens to hundreds of nm on the surface of the soft magnetic metal powder using hydroxide as an oxidizing agent. This method is characterized by using, as an oxidizing agent, steam generated when hydroxide decomposes and using a static atmosphere, and is used to form oxides on the surface of soft magnetic alloy by selectively oxidizing alloy elements such as Al and Si with stronger oxidizability than Fe. The method has the advantage of excellent bonding strength between metal and oxide because some of the alloy elements are oxidized and formed on the surface of the powder. In addition, there is an advantage in that the thickness of the oxide insulation film may be adjusted in the range of 20 to 100 nm by adjusting the amount of hydroxide to be added. However, since Al and Si should be selectively oxidized without oxidation of Fe, a partial pressure ratio of $P_{H2O}/PH_2$ inside a reactor should be controlled (Enveloping Fe-12% Al atomized powders in selectively-oxidized insulation films for soft magnetic composite (SMC) cores, J Alloys & Compounds 854 2021 157241). In this case, there is a disadvantage in that the internal volume of the reactor should be increased. When the internal volume of the reactor is constant, the amount of soft magnetic alloy powder to be processed per batch is reduced, which lowers productivity. In addition, since steam is used as an oxidizing agent, it is difficult to oxidize Fe capable of hydrogen reduction. Therefore, among the soft magnetic alloy powders indicated above, there is a disadvantage that may be applied only to Sendust, and Fe—Si and Fe—Al alloys having Si and Al content of 3% or more.

Therefore, when producing the powder core, the insulation film should be uniformly formed on the surface of each soft magnetic powder, and it is necessary to improve heat resistance to withstand high heat treatment temperature after molding the powder core.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide soft magnetic powder on which a high-quality oxide insulation film is formed, a manufacturing method thereof, and a high-performance powder core produced therefrom.

Specifically, the present invention has been made in an effort to provide soft magnetic powder having advantages of oxidizing elements such as Fe to form an oxide insulation film on surfaces of various soft magnetic metal powders, and forming an oxide having a uniform composition and a uniform thickness on the surfaces of the powders. In addition, the present invention has been made in an effort to provide a method of manufacturing soft magnetic powder having advantages of not causing sintering between powders in a high-temperature oxidation process, controlling an oxide thickness, and increasing productivity. In addition, the present invention has been made in an effort to provide a high-performance powder core produced therefrom.

An exemplary embodiment of the present invention provides soft magnetic powder including metal powder and an oxide insulation film coating a surface of metal powder particles, in which the metal powder particles may include one or more selected from pure iron or an iron-based alloy and the oxide insulation film may include an oxide of a component constituting the metal powder particles.

A thickness of the oxide insulation film may be in a range of 5 nm to 300 nm. The soft magnetic powder may further include a polymer coating layer positioned on an outer surface of the oxide insulation film, and a thickness of the polymer coating layer may be in a range of 10 nm to 300 nm.

Another embodiment of the present invention provides a method of manufacturing soft magnetic powder including preparing a powder mixture sample by mixing a metal powder containing at least one selected from pure iron or an iron-based alloy with an anti-sintering agent and forming an oxide insulation film on the metal powder particles. The forming of the oxide insulation film may include heating the powder mixture and oxidizing the soft magnetic metal powder with a certain amount of oxygen in a sealed container at a predetermined temperature.

The forming of the oxide insulation film may be performed while stirring the powder mixture sample.

The anti-sintering agent may be at least one selected from MgO, CaO, $Al_2O_3$, $SiO_2$, $TiO_2$ and $ZrO_2$ or at least one selected from LiOH, Mg $(OH)_2$, Ca $(OH)_2$, Sr $(OH)_2$, Ba $(OH)_2$, Mn $(OH)_4$, and Ti $(OH)_4$.

The amount of anti-sintering agent in the powder mixture may be in a range of 0.05 wt % to 1.00 wt. % based on a weight of the metal powder, and the oxidizing of the soft magnetic metal powder with the certain amount of oxygen in the sealed container may be performed at a temperature in a range of 300° C. to 1100° C.

The heating of the powder mixture may be performed in an inert gas atmosphere.

The oxidizing of the metal powder with the certain amount of oxygen in the sealed container may include controlling a thickness of the oxide insulation film formed on the surface of the metal powder by controlling the consumption of oxygen supplied to the sealed reactor. The amount of oxygen consumed may be adjusted in a range of $4.5*10^{-6}$ moles to $9.0*10^{-4}$ moles per gram of the metal powder based on $O_2$.

The method may further include after forming the oxide insulation film on the metal powder particles, forming a polymer coating layer on the surface of the formed oxide insulation film.

Yet another embodiment of the present invention provides a power core composed of the soft magnetic powder. The powder core may be produced by pressing the soft magnetic powder to form a molded body and annealing heat-treating the molded body in an atmosphere of nitrogen, hydrogen, or nitrogen-hydrogen mixed gas.

The annealing heat treating may be performed at a temperature in a range of 600° C. to 1100° C. when the soft magnetic powder contains at least one of Al or Si.

According to an embodiment of the present invention, soft magnetic powder contains an oxide insulation film having a uniform thickness on a surface, thereby improving the performance of a toroidal core produced using the same.

DETAILED DESCRIPTION OF THE EMBODIMENTS

The terms first, second, third, and the like are used to describe, but are not limited to, various parts, components, areas, layers and/or sections. These terms are used only to distinguish a part, component, region, layer, or section from other parts, components, regions, layers, or sections. Accordingly, a first part, a component, an area, a layer, or a section described below may be referred to as a second part, a component, a region, a layer, or a section without departing from the scope of the present invention.

Terminologies used herein are to mention only a specific Example, and do not to limit the present invention. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other properties, regions, integer numbers, steps, operations, elements, and/or components.

All terms including technical terms and scientific terms used herein have the same meaning as the meaning generally understood by those skilled in the art to which the present invention pertains unless defined otherwise. Terms defined in commonly used dictionaries are additionally interpreted as having meanings consistent with related technical literature and currently disclosed content, and are not interpreted in ideal or very formal meanings unless defined.

In addition, unless otherwise specified, % means wt %, and 1 ppm is 0.0001 wt %.

Hereinafter, exemplary embodiments of the present invention will be described in detail. However, it is to be understood that this exemplary embodiment is provided as an example, and the present invention is not limited by this exemplary embodiment, but is defined by only the scope of claims to be described below.

Figure 1:
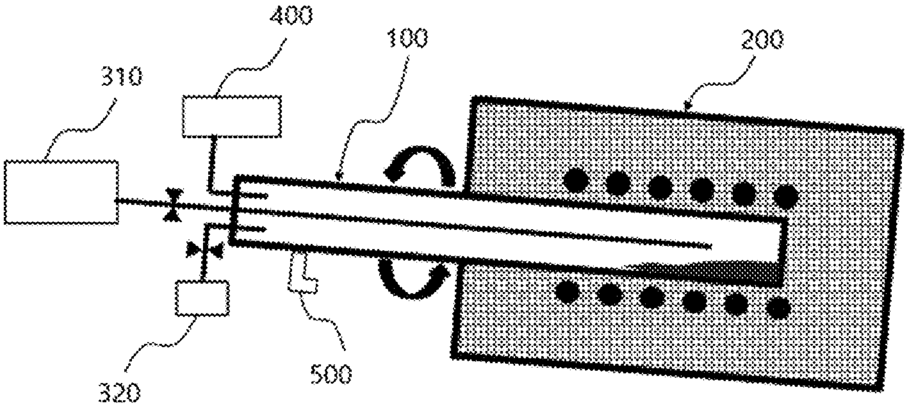
FIG. 1 is a diagram schematically illustrating equipment for manufacturing soft magnetic powder according to an exemplary embodiment.
Figure 2:
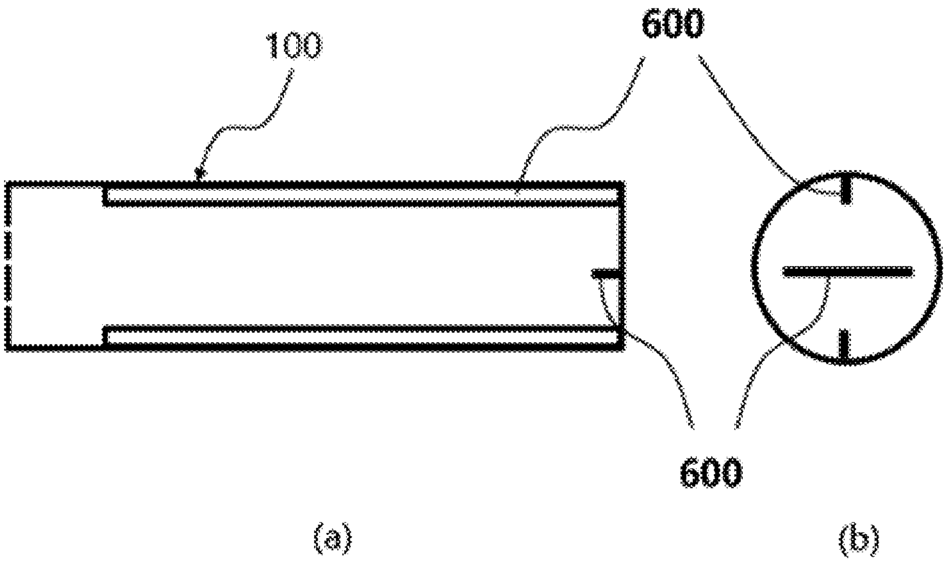
FIG. 2 is a cross-sectional view of a reactor of FIG. 1.

FIG. 1 is a diagram schematically illustrating equipment for manufacturing soft magnetic powder according to an exemplary embodiment and FIG. 2 is a cross-sectional view of a reactor of FIG. 1.

Referring to FIGS. 1 and 2, equipment of manufacturing soft magnetic powder according to an exemplary embodiment may be configured to include a reactor 100, a heating unit 200 that surrounds the reaction unit of the reactor 100, a gas supply unit 310 that supplies gas into the reactor 100, a gas outlet 320 that discharges gas inside the reactor 100 to the outside, a gas analyzer 400 that analyzes a gas composition and concentration inside the reactor 100, and a vibration unit 500 capable of applying vibration to the outer wall of the reactor 100. The reactor 100 may include a side wall of a cylindrical tube shape, and an upper plate and a bottom surface facing both ends of the cylindrical tube. The gas supply unit 310, the gas outlet 320, and the gas analyzer 400 may supply gas into the reactor 100 through a pipe penetrating through a front wall of the reactor 100 and analyze the discharge of the gas. In addition, the gas supply unit 310 and the gas outlet 320 may each include an opening/closing member such as a valve to control the amount of gas supplied and discharged.

One or more baffles 600 may be positioned on an inner wall surface of the reactor 100, and specifically, one or more baffles 600 may be positioned on the side wall or/and a rear end wall of the cylinder tube shape. The baffle 600 may be formed to extend from the side wall or the rear end wall of the reactor to a vertical height, and may be positioned vertically or inclined at a predetermined angle.

Meanwhile, the reactor 100 may be rotated by a rotating unit (not illustrated), and may be specifically rotated in a range of 1 rpm to 10 rpm, and the front end wall of the reactor 100 may be tilted so as to be higher in a horizontal standard than the rear end wall.

A soft magnetic metal powder composite surrounded by an oxide insulation film may be manufactured using the equipment for manufacturing the soft magnetic metal powder composite illustrated in FIG. 1 in the following manner.

A method for manufacturing soft magnetic powder coated with an oxide insulation film according to an exemplary embodiment of the present invention includes a step of preparing a sample containing powder particles containing at least one selected from pure iron (Fe) or an iron-containing alloy and a step of forming an oxide insulation film on the powder particles, in which the step of forming the oxide insulating film may include heating and oxidizing the powder particles.

The iron containing alloy may be at least one selected from Ni—Fe (Permalloy), Ni—Fe—Mo (Mo Permalloy), Fe—Si, Fe—Si—Al (Sendust), Fe—Co, an Fe-based amorphous alloy, and an Fe-based nano grain alloy, and an average particle diameter D50 of the pure iron (Fe) or the iron-based alloy powder particles may be in the range of 5 μm to 500 μm, and specifically in the range of 10 μm to 400 μm.

Meanwhile, an anti-sintering agent may be added to the powder particles including at least one selected from pure iron (Fe) or an iron-based alloy. The anti-sintering agent may be at least one selected from MgO, CaO, $Al_2O_3$, $SiO_2$, $TiO_2$ and $ZrO_2$ or at least one selected from LiOH, Mg $(OH)_2$, Ca $(OH)_2$, Sr $(OH)_2$, Ba $(OH)_2$, Mn $(OH)_4$, and Ti $(OH)_4$.

By adding the anti-sintering agent, it is possible to prevent sintering of the pure iron or iron-based alloy powder in the process of manufacturing the soft magnetic metal powder composite, so the surfaces of each pure iron or iron-based alloy powder particles react with oxygen, which is advantageous to form a uniform oxide layer on the surface of the pure iron or the iron-based alloy powder particles.

On the other hand, the anti-sintering agent may be particles in the form of particulates, and specifically, may have an average particle diameter of 1 μm or less. When the average particle diameter of the anti-sintering agent is within the above range, it is advantageous to form a uniform oxide layer on the surfaces of the pure iron or iron-based alloy powder particles because the anti-sintering agent may be uniformly positioned between the pure iron or iron-based alloy powder particles.

In addition, the anti-sintering agent may be added in a range of 0.05 wt % to 1 wt % of the pure iron or iron-based alloy powder based on mass. When the anti-sintering agent is added in the above mass range, the anti-sintering agent may be uniformly dispersed between the pure iron or iron-based alloy powder particles to effectively prevent the sintering of the pure iron or iron-based alloy powder. In addition, each of the pure iron or iron-based alloy powder is brought into contact with oxygen to form an oxide layer on each surface.

After charging the pure iron or iron-based alloy powder and/or the anti-sintering agent into the reactor 100, an inert gas is supplied through the gas supply unit 310 to make the reactor 100 into an oxygen-free inert gas atmosphere. This may be confirmed through the gas analyzer 400. The inert gas may be at least one gas selected from nitrogen and argon, and is not particularly limited as long as it does not react with the pure iron, the iron-based alloy, and the anti-sintering agent under high-temperature heating conditions.

After forming the inert gas atmosphere inside the reactor 100, the heating unit 200 is operated to heat the reactor 100 until the average temperature inside the reactor 100 reaches a temperature in the range of 300° C. to 1100° C. In this case, the inert gas may be continuously supplied through the gas supply unit 310 and the heated inert gas may be continuously discharged through the gas outlet 320. In this case, the inert gas atmosphere may be an atmosphere using nitrogen or argon, When the average temperature inside the reactor 100 reaches a target temperature, the supply of the inert gas may be stopped and oxygen may be supplied to perform an oxidation reaction. In addition, the supply of the inert gas may be stopped, and at the same time the gas outlet 320 may be closed to prevent gas inside the reactor 310 from being discharged to the outside. That is, the oxidation reaction may be performed under the condition that the inside of the reactor 100 is sealed. Specifically, before reaching the temperature, a gas outlet valve may be closed and a certain amount of oxygen may be supplied. By supplying the certain amount of oxygen, it is possible to control the amount of oxygen participating in the oxidation reaction, and thus, there is an advantage in that the amount of oxide formed by the oxidation reaction, that is, the thickness of the oxide layer may be controlled.

In this case, the oxygen is supplied as $O_2$ gas into the reactor 100, and may be supplied in a range of $4.5*10^{-6}$ mol to $2.2*10^{-3}$ mol based on the mass of the soft magnetic metal powder. In addition, the oxygen may be supplied in the range of 0.1 cc/g to 50 cc/g, and specifically 0.5 cc/g to 20 cc/g based on the mass of iron (Fe) charged into the reactor 100. When the oxygen is supplied in the above range, it is advantageous to form the desired thickness of the oxide layer, that is, the oxide insulation film in the present invention.

The oxidation reaction may be performed until the oxygen in the reactor 100 participates in the reaction and is exhausted, or may be performed until the oxygen concentration reaches a predetermined concentration. The oxygen concentration may be controlled according to the properties of the pure iron or iron-based alloy powder used as a raw material and the desired thickness of the oxide layer. The thickness of the oxide insulation film may be adjusted by adjusting the amount of oxygen consumed, and specifically, the amount of O2 gas consumed may be adjusted to be in the range of $9.0*10^{-6}$ moles to $8.8*10^{-4}$ moles based on the soft magnetic metal powder mass.

In addition, the oxidation reaction temperature varies depending on the type of soft magnetic metal powder. When iron oxide is formed on the surface like the pure iron, it is preferable to set the oxidation temperature to 570° C. or lower. When oxidized at a higher temperature, FeO is mainly formed, and when it reaches 570° C. during cooling after oxidation, a eutectoid reaction occurs and the properties of the oxide insulation film change (eutectoid reaction; $4FeO=Fe_3O_4+Fe$). On the other hand, in the case of the soft magnetic metals containing Si and Al, such as Fe—Si and Fe—Al alloys, it is preferable to oxidize at a high temperature of 700° C. or higher. As the oxidation temperature increases, the content of $SiO_2$ or $Al_2O_3$ in the resulting oxide layer increases. This is because $SiO_2$ or $Al_2O_3$ has an electrical specific resistance that is at least 107 times greater than that of iron oxide, which is advantageous for improving insulation properties. In addition, there is an advantage in that $SiO_2$ or $Al_2O_3$ does not undergo phase transformation with temperature change and has excellent insulating properties at high temperature. This may increase the annealing process temperature for resolving the strain caused inside the metal powder after forming the powder core, thereby improving the heat resistance of the insulation film.

Meanwhile, throughout the specification of the present invention, the oxide layer and the oxide insulation film refer to oxides formed on the outer surface of the pure iron or iron-based alloy powder, and are not particularly distinguished as the same.

The pure iron or iron-based alloy powder on which the oxide layer is formed may be mixed with a polymer solution and then heated to form the polymer coating layer on the surface of the oxide layer, and the polymer may be a silicone resin. In addition, the polymer solution may be formed by dissolving a polymer in an organic solvent. The pure iron or iron-based alloy powder on which the oxide layer is formed may be mixed/stirred with the polymer solution, and then heated to evaporate the organic solvent to form the polymer coating layer. Such a resin coating layer may be formed only when necessary. When the resistance of the oxide coating layer is low, a resin layer may be formed to improve the resistance. For example, $Fe_3O_4$ formed by high-temperature oxidation of iron has a specific resistance as low as $\sim10^{-2}$ Ω·cm, which is insufficient to serve as an insulating layer. In this case, by forming a resin coating layer on the $Fe_3O_4$ layer, it is possible to improve the insulating properties and reduce the loss of the powder core. In addition, there is a need to coat a resin layer on the oxide layer for the purpose of improving moldability when molding into a powder core in the case of powder that is difficult to mold, such as sendust. Of course, improvement in moldability may be achieved by other methods as well. In this case, the resin layer is not required.

A soft magnetic metal powder coated with an oxide layer according to another embodiment of the present invention has a nucleus-shell structure. Here, the nucleus has a different meaning from the core used in the powder core, and means metal powder present inside coated with an oxide layer. The shell means an oxide layer formed by the method proposed in this patent.

The metal powder corresponding to the nucleus of the nucleus-shell structure includes at least one selected from the pure iron or iron-based alloy, and the iron-based alloy may be at least one selected from Ni—Fe (Permalloy), Ni—Fe—Mo (Mo Permalloy), Fe—Si, Fe—Si—Al (Sendust), Fe—Co, Fe-based amorphous alloy, and Fe-based nano grain alloy. In addition, the average particle diameter D50 of the metal powder may be in the range of 5 μm to 500 μm, and specifically 10 μm to 400 μm.

The oxide layer may include an oxide of a component constituting the metal powder, and specifically may include an oxide or hydroxide used as the anti-sintering agent.

The thickness of the oxide layer may be in the range of 5 nm to 500 nm, specifically 10 nm to 300 nm, and more specifically 10 nm to 150 nm. When the thickness of the oxide layer is within the above range, there is an advantage in optimizing the performance of the produced powder core.

Meanwhile, a polymer coating layer having a uniform thickness may be positioned on the surface of the oxide layer. The thickness of the polymer coating layer may be in the range of 5 nm to 500 nm, specifically in the range of nm to 300 nm, and more specifically in the range of 20 nm to 150 nm. By additionally forming the polymer coating layer, it is possible to not only increase the insulation of the soft magnetic powder, but also prevent the oxide insulation film from being damaged during compression molding of the powder core to be described later. Since the polymer coating layer is used for this purpose, the polymer coating layer may serve as an auxiliary means as described above.

The powder core according to another embodiment of the present invention may be composed of the soft magnetic metal powder coated with the oxide layer or the soft magnetic metal powder coated with the oxide layer and the polymer layer.

The powder core may be produced in the following method. First, the oxide layer or the soft magnetic powder coated with the insulating film composed of the oxide layer-polymer layer is pressed with a predetermined pressure to form a molded body, and the molded body may be annealing heat-treated by heating in an inert or hydrogen-containing reducing gas atmosphere, and then the annealing heat-treated molded body may be cooled and coated with homica. The annealing heat treatment as described above may remove strain caused in the soft magnetic powder during the molding into the powder core, and the homica coating may facilitate handling of the annealed powder core.

The step of forming the molded body by pressing the soft magnetic powder may be performed at a pressure of 0.8 GPa or more, and specifically, at a pressure of 1.0 GPa or more.

The molded body may be heat-treated for 5 minutes or more at a temperature in the range of 400° C. to 1100° C. in an inert or reducing atmosphere containing hydrogen.

Hereinafter, preferred preparation examples and examples of the present invention are described. However, the following preparation examples and examples are only preferred preparation examples and examples of the present invention, but the present invention is not limited to the following preparation examples and examples.

Example 1: Pure Iron Powder Coated with Fe Oxide Layer

After putting 200 g of pure iron powder (Heganes Co., Ltd., average particle size 100 μm) and 0.6 g $Mg(OH)_2$ into the reactor, the reactor was heated to 500° C. while rotating at 2 rpm under the condition that nitrogen gas was continuously supplied into the reactor through the gas supply unit. In this case, the gas inside the reactor was continuously discharged through the gas outlet.

After the internal temperature of the reactor increased to 500° C., the supply of nitrogen gas was stopped, and a valve disposed in the gas outlet was closed (off). Then, $O_2$ gas was supplied at $1.47*10^{-4}$ mol/g-Fe based on the unit mass of the pure iron powder, and then the oxidation reaction between the pure iron powder and oxygen was performed while rotating the reactor. In this case, the net oxygen supply amount means the volume at room temperature conditions. In addition, an impact may be applied to the outer wall of the reactor by driving a vibration unit. In addition, the oxygen concentration inside the reactor was analyzed in real time using the gas analyzer, and the oxidation reaction was performed until the oxygen concentration reached 0 ppm. In this case, the oxidation reaction time was measured as 4 minutes and 40 seconds.

After the completion of the reaction, it was cooled to room temperature, and then the oxidized pure iron powder, that is, the soft magnetic powder, which was a solid material inside the reactor, was separated.

Figure 3:
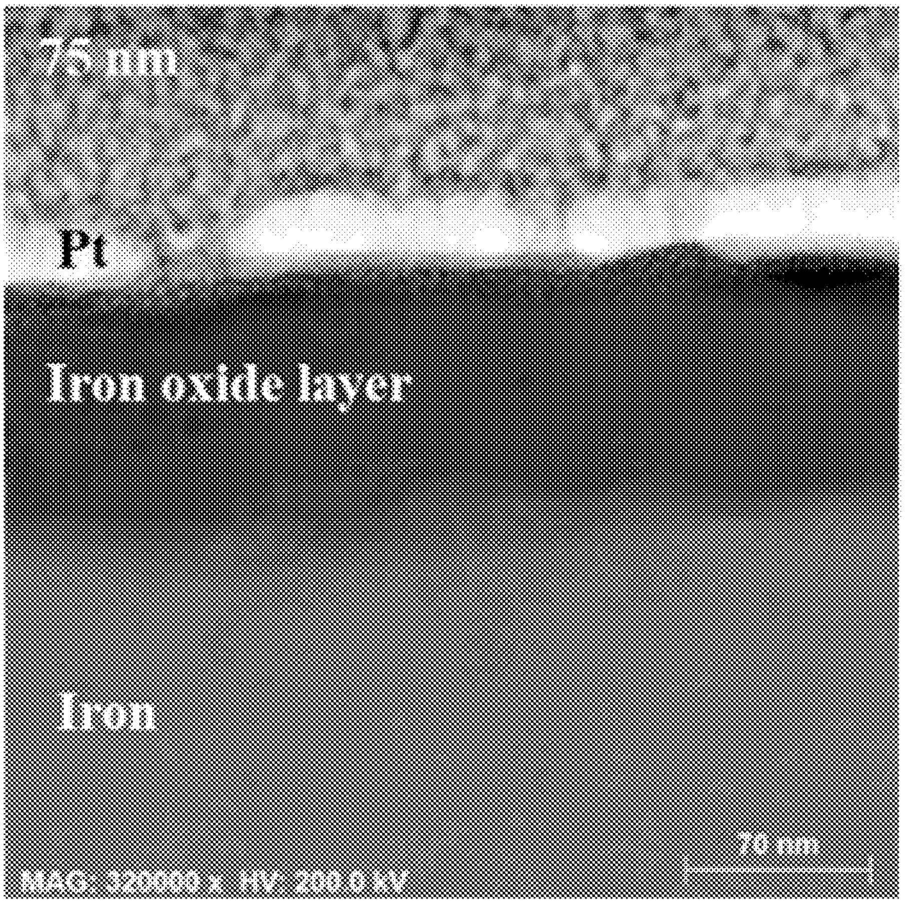
FIG. 3 is a diagram a cross-sectional TEM image of an oxidized pure iron powder according to Example 1.

FIG. 3 illustrates cross-sectional TEM image of the pure iron powder oxidized by the above method. Referring to FIG. 3, it may be confirmed that an Fe oxide layer having an average thickness of about 75 nm is formed, and it may also be confirmed that the Fe oxide layer is formed by being well attached to the Fe powder.

Except for supplying $O_2$ gas at $4.91*10^{-5}$ mol/g-Fe, $9.82*10^{-5}$ mol/g-Fe, and $1.96*10^{-4}$ mol/g-Fe, respectively, based on the mass of the pure iron powder, the pure iron powder coated with iron oxide was prepared in the same manner as described above.

Figure 4:
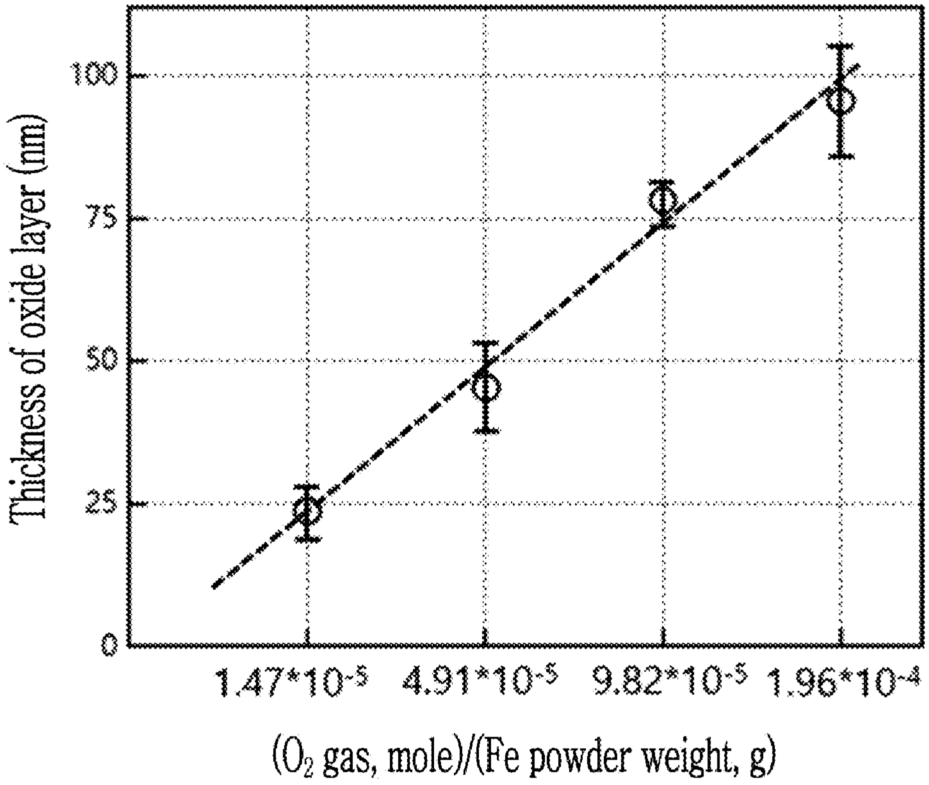
FIG. 4 is a diagram illustrating a thickness of an oxide layer formed on a surface of the pure iron powder according to the supply amount of oxygen.

FIG. 4 is a diagram illustrating a thickness of an oxide layer formed on a surface of the pure iron powder according to the supply amount of oxygen.

Referring to FIG. 4, it can be seen that the thickness of the oxide layer formed increases as the amount of oxygen supplied based on the mass of the pure iron powder increases. In addition, it may be confirmed that the thickness of the oxide layer changes in proportion to the amount of oxygen supplied. Accordingly, it can be seen that the thickness of the oxide layer, that is, the oxide insulation film, may be controlled by adjusting the oxygen supply amount.

As a result of X-ray analysis of the Fe oxide prepared by the above method, it was confirmed that the Fe oxide was $Fe_3O_4$. The pure iron powder coated with $Fe_3O_4$ was molded at a pressure of 1.2 GPa to produce a toroidal core having an outer diameter of 12.7 mm, an inner diameter of 7.6 mm, and a height of 4 mm. In order to remove the strain generated during the molding, the toroidal-type powder core was annealed at a temperature of 500° C. for 1 hour in a nitrogen atmosphere. The outer surface of the core obtained by the furnace cooling was coated with homica, and a primary coil and a secondary coil were each wound on the core with 36 turns. The core loss was measured at a magnetic flux density of 1 T and a frequency of 400 Hz.

Figure 5:
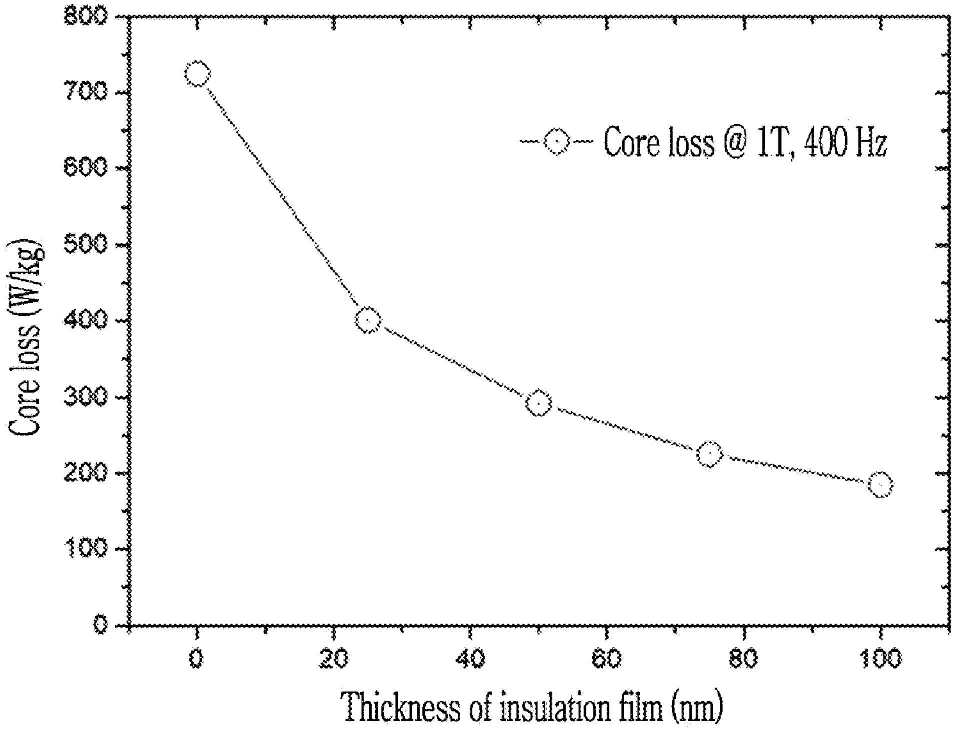
FIG. 5 is a diagram illustrating a core loss of a toroidal core using soft magnetic powders having different thicknesses of oxide layers.

FIG. 5 is a diagram illustrating a core loss of a toroidal core using soft magnetic powders having different thicknesses of oxide layers. Specifically, FIG. illustrates core loss of a toroidal core produced using four types of soft magnetic metal powders having different thicknesses of Fe oxide layers described above. For comparison, FIG. 5 also illustrates the core loss of the toroidal core made of pure Fe without an Fe oxide layer. Referring to FIG. 5, it was observed that the core loss decreased by about half when the Fe oxide layer was present. In addition, as the average thickness of the Fe oxide layer increases from 25 nm to 100 nm, it can be observed that the core loss of the toroidal core produced therefrom decreases. This is due to the reduction of the eddy current loss.

Example 2: Pure Iron Powder Coated with a Two-Laver Insulation Film Composed of Fe Oxide Layer and Resin Layer Resin (ES-1002T silicone resin from Shun-Etsu) was additionally coated on the pure iron powder coated with the Fe oxide layer having an average thickness of 25 nm in Example 1 to form a two-layer insulation composed of an iron oxide insulation film and a resin insulation film. A silicone resin was dissolved in toluene to form a solution, mixed with pure iron powder coated with an Fe oxide layer, and heated while rotating the reactor to evaporate toluene, thereby forming a resin coating layer on the surface of the oxide layer.

Figure 6:
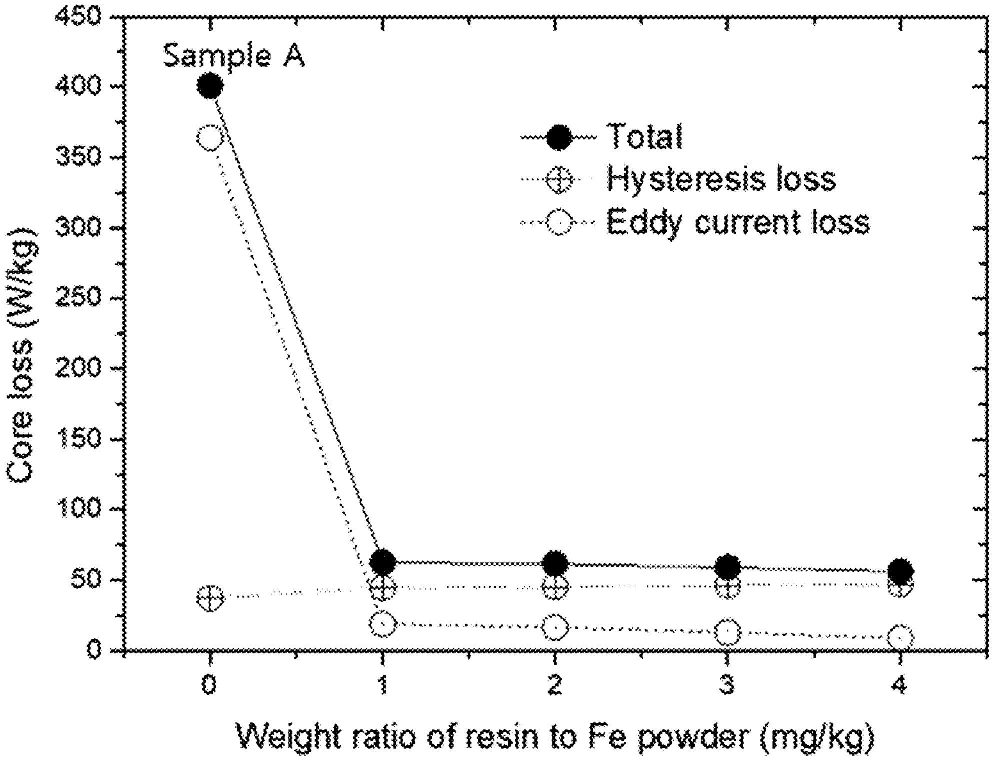
FIG. 6 is a diagram illustrating a change in core loss of a toroidal core according to Example 2.

In this case, the resin was mixed at 1 μg/g (1 ppm), 2 μg/g (2 ppm), 3 μg/g (3 ppm), and 4 μg/g (4 ppm) based on the unit mass of the pure iron powder. In this way, four types of pure iron powders surrounded by two-layer insulation films with different amounts of resin coating layers were manufactured. The toroidal core was manufactured in the same manner as in Example 1, the core loss at 1 T-400 Hz was measured, and the results were illustrated in FIG. 6. Referring to FIG. 6, sample A, in which the resin mixing amount is 0 μg/g, means a powder core made of pure iron powder without the resin coating layer. As a result of the TEM cross-section observation, when 4 μg/g of resin was used, the average thickness of the resin coating layer was about 30 nm. As illustrated in FIG. 6, it can be confirmed that the core loss is rapidly reduced when a resin coating layer having a thickness of several tens of nm is present on the Fe oxide layer. It was found that when there was no resin coating layer, the core loss was 400.9 W/kg, when the resin coating layer was formed by mixing 1 ppm of resin, the core loss rapidly decreased to 62.7 W/kg, and when the mixing amount of a resin was increased to 2 ppm, 3 ppm, and 4 ppm, the iron loss decreased to 61.4, 59.2, and 56.1 W/kg, respectively. In addition, the increase in hysteresis loss was observed as the amount of resin used increased, but the degree of decrease was smaller than that of eddy current loss. The reason why the core loss decreased with the increase in the amount of resin was because the insulating properties increased as the resin content increased, and the eddy current loss decreased to 18.1, 16.2, 12.7, and 8.6 W/kg. This is a phenomenon that appeared because the specific resistance of the resin is about $10^{13}$ Ω·cm, about $10^{15}$ times greater than the specific resistance of $Fe_3O_4$. From the above, it can be seen that it is advantageous that the specific resistance of the insulation film is large.

Example 3: High Temperature Oxidation of Fe-4.5% Si Powder

After 500 g of Fe-4.5% Si powder (gas atomizing powder, average particle size 150 μm) and 1.0 g MgO were introduced into the reactor, the reactor was heated to 900° C. while rotating at 5 rpm under the condition that argon gas was continuously supplied into the reactor through the gas supply unit. In this case, the gas inside the reactor was continuously discharged through the gas outlet.

After the internal temperature of the reactor increased to 900° C., the supply of argon gas was stopped, and a valve disposed in the gas outlet was closed (off). Then, $2.23*10^{-5}$ mol/g-(Fe-4.5% Si) of oxygen is supplied based on the unit mass of the Fe-4.5% Si powder, and then the reactor performed an oxidation reaction between the Fe-4.5% Si powder and oxygen while rotating. In this case, the net oxygen supply amount means the volume at room temperature conditions. In addition, an impact may be applied to the outer wall of the reactor by driving a vibration unit. In addition, the oxygen concentration inside the reactor was analyzed in real time using the gas analyzer, and the oxidation reaction was performed until the oxygen concentration reached 0 ppm. In this case, the oxidation reaction time was measured as 30 minutes.

After the completion of the reaction, it was cooled to room temperature, and the soft magnetic powder which is a solid material inside the reactor was separated.

The Fe-4.5% Si powder surrounded by the oxide layer produced by the above method was molded at 1.2 GPa to produce a toroidal core molded body, and then annealed in a nitrogen atmosphere at temperatures of 800° C., 900° C., and 1,000° C. for 1 hour, respectively. The toroidal core was wound in the same manner as in Example 1. As a result of measuring the core loss at a magnetic flux density of 0.7 T and a frequency of 400 Hz, the annealing temperature was 21.7 W/kg at 800° C., 16.7 W/kg at 900° C., and 15.8 W/kg at 1,000° C. The decrease in the core loss with the increase in the annealing temperature suggests that the SiO2-MgO oxide layer produced by the oxidation reaction maintains its insulating properties well even at a high temperature of about 1,000° C. On the other hand, the specific resistance of $SiO_2$ is as high as $10^{14}$ to $10^{16}$ Ω·cm, so unlike the $Fe_3O_4$ oxide layer, there is no need for a separate resin coating to increase the specific resistance of the coated insulating layer.

Example 4: Fe-1.0% Si Alloypowder

Except for using Fe-1.0% Si powder (gas atomizing powder, average particle size 150 μm) instead of Fe-4.5% Si powder, and using $Mg(OH)^2$ instead of MgO, Fe—Si powder surrounded by an oxide layer was prepared under the same conditions as in Example 3. In addition, the oxidation reaction time was 20 minutes.

Figure 7:
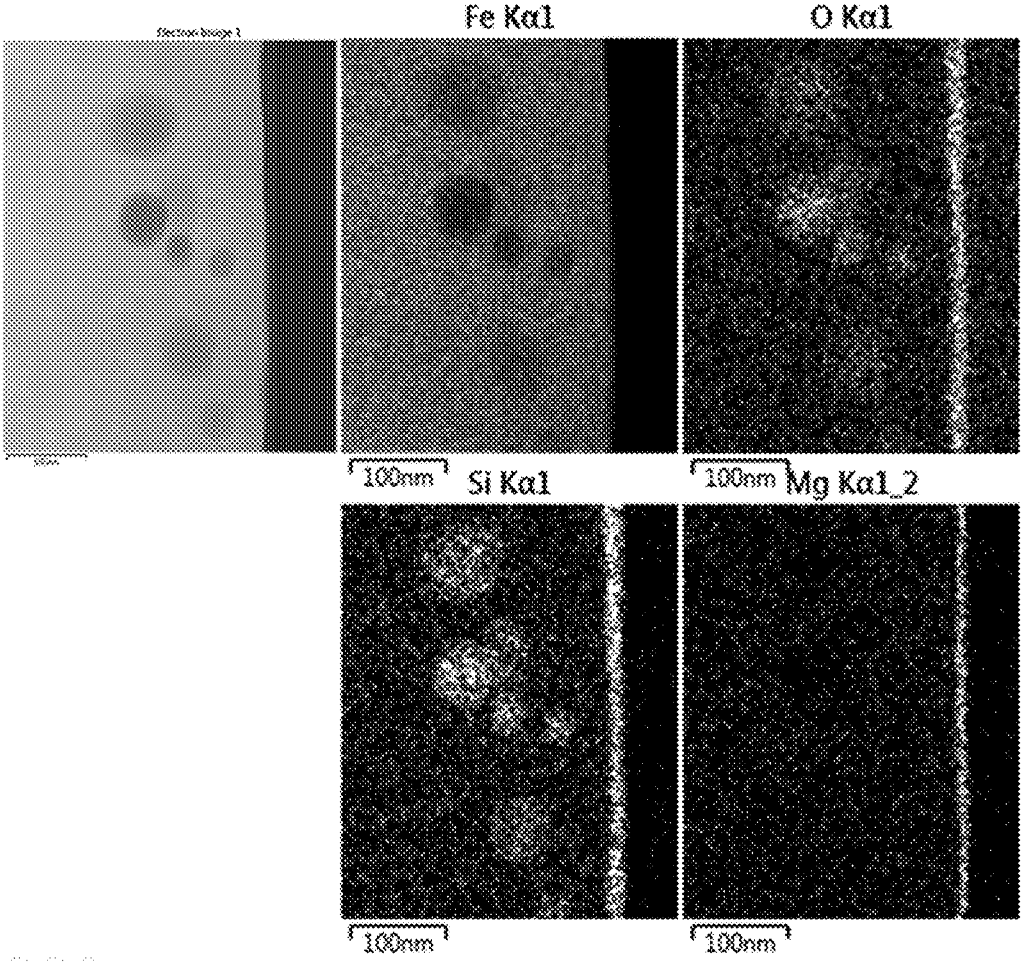
FIG. 7 is a diagram illustrating a TEM cross-sectional image of oxidized Fe-1.0% Si.

FIG. 7 is a diagram illustrating a TEM cross-sectional image of oxidized Fe-1.0% Si. In addition, EDS mapping images of Fe, Si, Mg, and O, which are constituent elements, are also illustrated. As illustrated in FIG. 7, when Fe-1.0% Si is oxidized by this method at 900° C., it can be observed that an oxide layer composed of $SiO_2$ and MgO exists on the surface.

The Fe-1.0% Si powder coated with the oxide layer produced by the above method was molded at 1.2 GPa to produce a toroidal core molded body, and then annealed in a nitrogen atmosphere at temperatures of 600° C., 700° C., 800° C., and 900° C. for 1 hour, respectively. The toroidal core was wound in the same manner as in Example 1. As a result of measuring the core loss at a magnetic flux density of 1.0 T and a frequency of 400 Hz, the annealing temperature was 37.6 W/kg at 600° C., 32.5 W/kg at 700° C., 32.3 W/kg at 800° C., and 33.1 W/kg at 900° C. There was little change in core loss when the annealing temperature was 700° C. or higher. Similar to Example 3, it was confirmed that the oxide layer composed of $SiO_2$ and MgO well maintained the insulating properties even at a high temperature annealing of about 900° C. As described above, it is not necessary to perform a separate resin coating even at this time.

The toroidal core was formed in the same manner as in Example 4 using the Fe-1.0% Si powder coated with the oxide layer produced in Example 4, and annealed at 800° C. for 1 hour in a hydrogen atmosphere. In the 1 T-400 Hz condition, the core loss was measured as 28.3 W/kg. It was confirmed that the core loss may be reduced by controlling the annealing atmosphere.

Example 5: Fe-2.0% Al Alloypowder

Except for using Fe-2.0% Al powder (gas atomizing powder, average particle size 150 μm) and using $1.56*10^{-5}$ mole/g of oxygen amount, Fe-2.0% Al powder coated with an oxide layer was prepared under the same conditions as in Example 3. The oxidation reaction time at this time was 25 minutes. TEM analysis confirmed that the oxide layer was composed of $Al_2O_3$ and MgO. The Fe-2.0% Si powder coated with the oxide layer produced by the above method was molded at 1.2 GPa to produce a toroidal core molded body, and then annealed in a nitrogen atmosphere at temperatures of 700° C., 800° C., and 900° C. for 1 hour, respectively. The toroidal core was wound in the same manner as in Example 1. As a result of measuring the core loss at a magnetic flux density of 1.0 T and a frequency of 400 Hz, the annealing temperature was 38.7 W/kg at 700° C., 39.1 W/kg at 800° C., and 38.4 W/kg at 900° C. There was little change in core loss when the annealing temperature was 700° C. or higher. Accordingly, it was confirmed that the oxide film composed of $Al_2O_3$ and MgO well maintained the insulating properties even at a high temperature annealing of about 900° C. As described above, it is not necessary to perform a separate resin coating even at this time.

Example 6: SENDUST (Fe-9.0% Si-5.0% Al) Powder

After 500 g of Sendust (Fe-9% Si-5% Al) powder (gas atomizing powder, average particle size of 20 μm) and 0.5 g $Mg(OH)_2$ were introduced into the reactor, the SENDUST powder coated with the oxide layer was produced in the same manner as in Example 3. The oxidation metal powder whose surface is coated with the oxide layer was prepared by varying the amount of oxygen under four conditions: $1.79*10^{-5}$ mol/g_sendust, $3.57*10^{-5}$ mol/g, $5.36*10^{-5}$ mol/g, and $7.14*10^{-5}$ mol/g. Each of the toroidal cores was prepared using the above four types of oxide-coated powders and evaluated. As a result of TEM analysis, it was confirmed that the oxide layer was composed of $Al_2O_3$ and MgO regardless of the amount of oxygen injected. It was observed that the thickness of the oxide layer increased linearly with the increase in the amount of oxygen used. When the amount of oxygen used is $1.79*10^{-5}$ mol/g_sendust, the average thickness of the oxide layer formed was measured as about 10 nm, when the amount of oxygen used is $3.57*10^{-5}$ mol/g, the average thickness of the oxide layer formed was measured as about 20 nm, when the amount of oxygen used is $5.36*10^{-5}$ mol/g, the average thickness of the oxide layer formed was measured as about nm, and when the amount of oxygen used is $7.14*10^{-5}$ mol/g, the average thickness of the oxide layer formed was measured as about 40 nm.

The Sendust powder coated with the oxide layer produced by the above method was molded at 1.2 GPa to produce a toroidal core molded body, and then annealed in a nitrogen atmosphere at temperatures of 700° C. for 1 hour. The toroidal core was wound in the same manner as in Example 1. Since four types of Sendust cores with different thicknesses of oxide layer were produced, and Sendust core is used in the high-frequency region, the core loss was measured under the condition of 0.1 T-50 kHz. When the amount of oxygen used was $1.79*10^{-5}$ mol/g, the core loss was measured as 81.1 $mW/cm^3$, when the amount of oxygen used was $3.57*10^{-5}$ mol/g, the core loss was measured as 135.1 $mW/cm^3$, when the amount of oxygen used was $5.36*10^{-5}$ mol/g, the core loss was measured as 188.0 $mW/cm^3$, and when the amount of oxygen used was $7.14*10^{-5}$ mol/g, the core loss was measured as 256.2 $mW/cm^3$.

Figure 8:
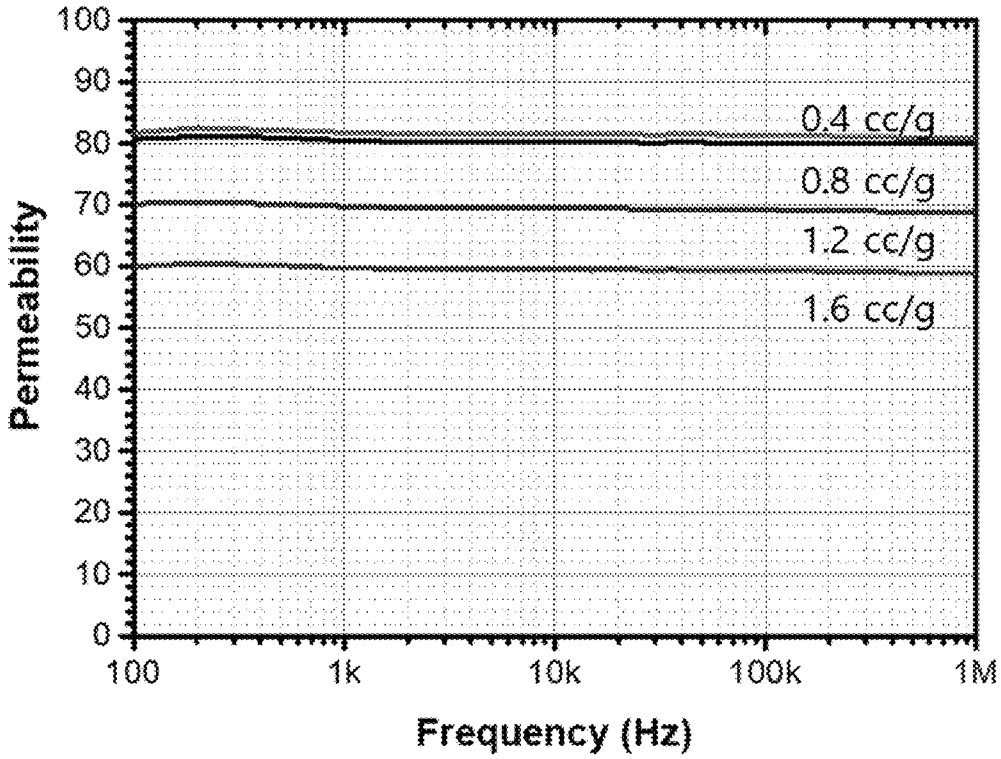
FIG. 8 is a result of measuring permeability of the toroidal core according to Example 6.

FIG. 8 is a result of measuring permeability of the toroidal core according to Example 6. Referring to FIG. 8, it can be seen that the permeability of the toroidal core is almost constant up to a frequency of 1 MHz. Therefore, the oxide layer formed on the surface of the Sendust powder according to the present invention has excellent insulating properties, and even after the toroidal core molded body is heat-treated at a high temperature of 700° C., the insulating properties are well maintained, so it was confirmed that the performance of the oxide insulating layer is excellent.

On the other hand, under the same frequency condition, the permeability tended to decrease as the thickness of the oxide layer increased, which is considered to be due to the decrease in the volume fraction occupied by the magnetic material in the core. Therefore, it can be seen that the permeability of the powder core may be controlled as desired by adjusting the thickness of the oxide layer of the soft magnetic powder.

The present invention is not limited to the exemplary embodiments, but may be manufactured in a variety of different forms, and those of ordinary skill in the art to which the present invention pertains will understand that the present invention may be implemented in other specific forms without changing the technical spirit or essential features of the present invention. Therefore, it should be understood that the above-mentioned exemplary embodiments are exemplary in all aspects but are not limited thereto.

What is claimed is:

1. Soft magnetic powder, comprising:

metal powder;

an oxide insulation film coating a surface of metal powder particles; and a polymer coating layer positioned on an outer surface of the oxide insulation film, wherein the metal powder particles include one or more selected from pure iron or an iron-based alloy, and the oxide insulation film includes an oxide of a component constituting the metal powder particles, wherein a thickness of the polymer coating layer is in a range of 10 nm to 300 nm.

2. The soft magnetic powder of claim 1, wherein:

a thickness of the oxide insulation film is in a range of 5 nm to 300 nm.

3. A method of manufacturing soft magnetic powder, comprising:

preparing a powder mixture sample by mixing a metal powder containing at least one selected from pure iron or an iron-based alloy with an anti-sintering agent; and forming an oxide insulation film on the metal powder particles, wherein the forming of the oxide insulation film includes heating the powder mixture and oxidizing the soft magnetic metal powder with a certain amount of oxygen in a sealed container at a predetermined temperature, wherein the forming of the oxide insulation film is performed while stirring the powder mixture sample.

4. The method of claim 3, wherein:

the anti-sintering agent is at least one selected from MgO, CaO, $Al_2O_3$, $SiO_2$, $TiO_2$ and $ZrO_2$ or at least one selected from LiOH, $Mg(OH)_2$, $Ca(OH)_2$, $Sr(OH)_2$, $Ba(OH)_2$, $Mn(OH)_4$, and $Ti(OH)_4$.

5. The method of claim 3, wherein:

the amount of anti-sintering agent in the powder mixture is in a range of 0.05 wt % to 1.00 wt % based on a weight of the metal powder.

6. The method of claim 3, wherein:

the oxidizing of the soft magnetic metal powder with the certain amount of oxygen in the sealed container is performed at a temperature in a range of 300° C. to 1100° C.

7. The method of claim 3, wherein:

the heating of the powder mixture is performed in an inert gas atmosphere.

8. The method of claim 3, wherein:

the oxidizing of the metal powder with the certain amount of oxygen in the sealed container includes controlling a thickness of the oxide insulation film formed on the surface of the metal powder by controlling the consumption of oxygen supplied to the sealed reactor.

9. The method of claim 8, wherein:

the amount of oxygen consumed is adjusted in a range of $4.5*10^{-6}$ to $9.0*10^{-4}$ moles per gram of the metal powder based on $O_2$.

10. The method of claim 3, further comprising:

after forming the oxide insulation film on the metal powder particles, forming a polymer coating layer on the surface of the formed oxide insulation film.

11. A powder core composed of the soft magnetic powder of claim 1.

12. The powder core of claim 11, wherein the powder core is produced by:

pressing the soft magnetic powder to form a molded body; and annealing heat-treating the molded body in an atmosphere of nitrogen, hydrogen, or nitrogen-hydrogen mixed gas.

13. The powder core of claim 12, wherein:

the annealing heat-treating is performed at a temperature in a range of 600° C. to 1100° C.

when the oft magnetic powder contains at least one of Al and Si.

* * * * *